United States Patent [19]
Ooi et al.

[11] Patent Number: 5,805,364
[45] Date of Patent: Sep. 8, 1998

[54] LENS AND HOUSING ASSEMBLY

[75] Inventors: Ban Hin Ooi, Jalan Mayang Pasir; Firdaus Haji Abdul Munir; Yee Thai Foong, both of Penang, all of Malaysia

[73] Assignee: Motorola, Inc., Schaumburg, Ill.

[21] Appl. No.: 963,031

[22] Filed: Nov. 10, 1997

[51] Int. Cl.$^6$ .................................................. G02B 7/02
[52] U.S. Cl. ........................................ 359/819; 359/513
[58] Field of Search ................................. 359/819, 811, 359/513, 514, 808

[56] References Cited

U.S. PATENT DOCUMENTS 5,042,821  8/1991  Bontly ...................................... 359/513
5,050,963  9/1991  Murakami ............................... 359/808
5,461,444  10/1995  Okura et al. ............................. 359/819

*Primary Examiner*—Loha Ben
*Attorney, Agent, or Firm*—Dale W. Dorinski

[57] ABSTRACT

An assembly (1) for mounting a lens onto a housing comprising a housing (3) with aperture (5) providing a passage between a housing outer surface (11) and a housing inner surface (12). There is also a lens (2) complementarily engaging the aperture (5) thereby preventing the lens (5) from passing through the aperture (5). A seal (4) is adhered to both said a lens inner surface (14) and the housing inner surface (12) to thereby provide a water resistant seal.

11 Claims, 2 Drawing Sheets

LENS AND HOUSING ASSEMBLY

FIELD OF THE INVENTION

This invention relates to a lens and housing assembly for providing a water resistant seal. In particular, the assembly is used for providing mounting of the lens adjacent a Liquid Crystal Display (LCD) or other display device located inside the housing.

BACKGROUND ART

One conventional way of mounting a lens associated with an LCD to a housing of, for example, a communication device is by gluing an underside periphery of the lens to an outer surface of the housing. The lens is positioned to cover an aperture in the housing through which the LCD can be viewed. However, this conventional way of mounting does not necessarily provide a water resistant seal partly due to the rigidity of the lens and limited abutting surface areas of the housing and lens.

SUMMARY OF THE INVENTION

It is an aim of this invention to overcome or alleviate at least one of the problems associated with water resistant sealing of lens and housing assemblies or at least provide the public with a useful alternative.

According to one aspect of the invention there is provided an assembly for mounting a lens onto a housing, the assembly comprising:

- a housing having aperture therein providing a passage between a housing outer surface and a housing inner surface;
- a lens complementarily engaging said aperture, said complementarily engaging preventing said lens from passing through said aperture, said lens having a lens outer surface and lens inner surface; and
- a seal adhered to both said lens inner surface and said housing inner surface thereby providing a water resistant seal.

Preferably, said lens and said housing may provide a flush alignment of a periphery of the lens outer surface and the housing outer surface adjacent said lens.

Suitably, said aperture may have at least two facing tapered surfaces and said lens has at least two opposing tapered edges abutting a respective one of said tapered facing surfaces thereby preventing said lens from passing through said aperture.

Preferably, said opposing tapered edges may be on all sides of said lens and said tapered surfaces may be on all surfaces of said aperture.

In one alternative form, said aperture may preferably have at least two facing concave surfaces and said lens may have at least two opposing convex edges abutting a respective one of said concave facing surfaces thereby preventing said lens from passing through said aperture.

Suitably, said opposing convex edges may be on all sides of said lens and said convex surfaces may be on all surfaces of said aperture.

In another alternative form, said aperture may preferably have one or more inward extending shoulders for complementary engaging with a portion of said lens to thereby prevent said lens from passing through said aperture.

Suitably, said shoulders may form a continuous ledge.

Preferably, said seal may comprise a clear sheet.

Suitably, said seal has an aperture therein to allow a display enclosed in said housing to be observed from said sad lens outer surface.

Preferably, there may be a display device enclosed in said housing and located adjacent said inner surface to thereby provide display data through said lens.

BRIEF DESCRIPTION OF THE DRAWINGS

In order that the invention may be readily understood and put into practical affect, reference will now be made to preferred embodiments as illustrated with reference to the accompanying drawings in which.

DETAILED DESCRIPTION OF THE PREFERRED EMBODIMENTS OF THE INVENTION

Figure 1:
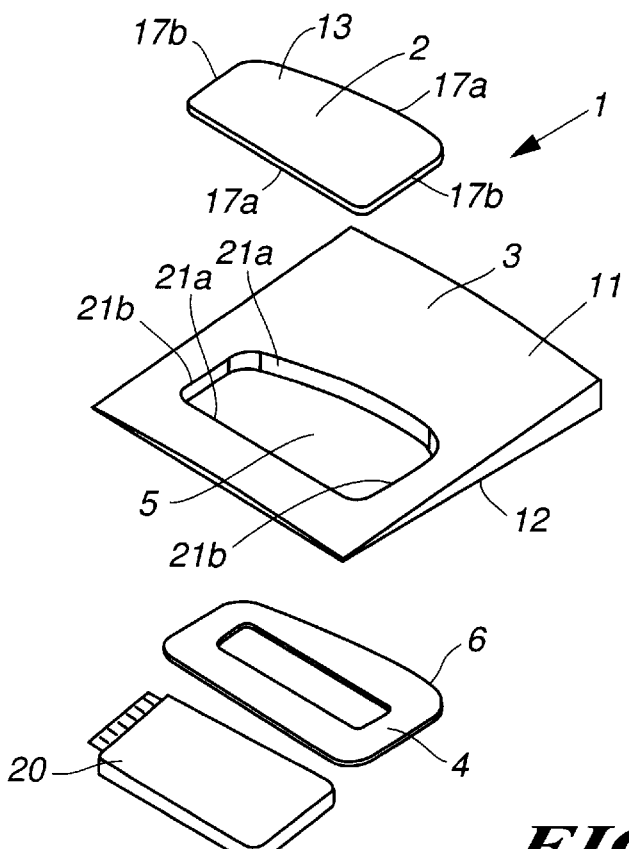
FIG. 1 an exploded perspective view of a first preferred embodiment of an assembly in accordance with the invention.
Figure 2:
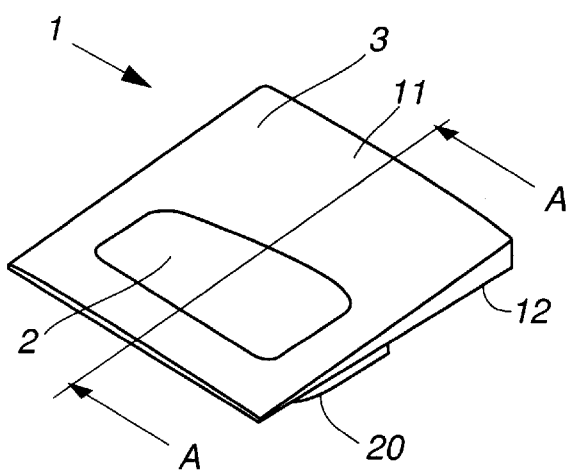
FIG. 2 is perspective view of the assembly of FIG. 1 when assembled.
Figure 3:
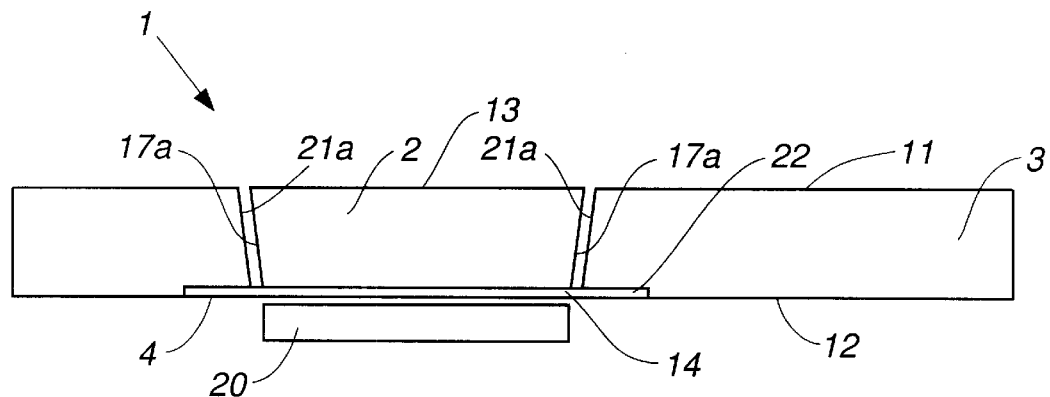
FIG. 3 is a cross-sectional view through A—A of the assembly of FIG. 2.

Referring to FIG. 1 to 3 there is illustrated a first embodiment of a lens and housing assembly 1 comprising a transparent lens 2, a housing 3 and a seal 4. Although only part of the housing 3 is illustrated it will be apparent to a person skilled in the art that this housing 3 is part of a complete housing that encloses a display such as an LCD 20.

The housing 3 has an aperture 5 providing a passage between a housing outer surface 11 and housing inner surface 12. The lens 2 has a lens outer surface 13 and a lens inner surface 14 with pairs of opposing tapered edges 17a,17b for complementarily engaging with respective ones of facing surfaces 21a,21b of aperture 5.

The seal 4 is a clear flexible sheet adhered by an adhesive 6 to a peripheral portion of the lens inner surface 14 and a recessed portion 22 of housing inner surface 12. This therefore provides a water resistant seal and the complementarily engaging of the lens 2 and aperture 5 is such that lens 2 cannot pass through aperture 5.

Figure 4:
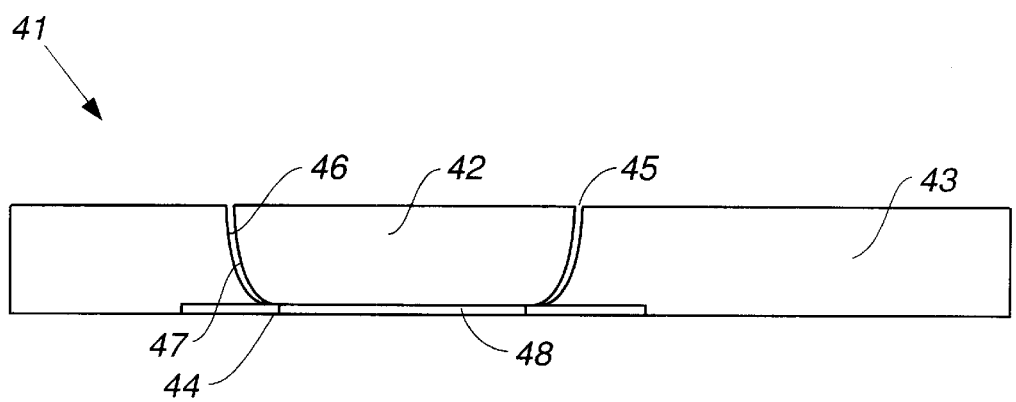
FIG. 4 is a cross-sectional view of a second preferred embodiment of an assembly in accordance with the invention.

Referring to FIG. 4 there is illustrated a second preferred embodiment of an assembly 41 comprising a transparent lens 42, a housing 43 and an opaque seal 44 having an aperture therein 48. The aperture allows the LCD 20 to be observed from the lens outer surface. Again there is an aperture 45 in housing 43 with concave surfaces 46 complementarily engaging convex edges 47 of lens 42. All other features are the same as that of assembly 1 and need no further discussion.

Figure 5:
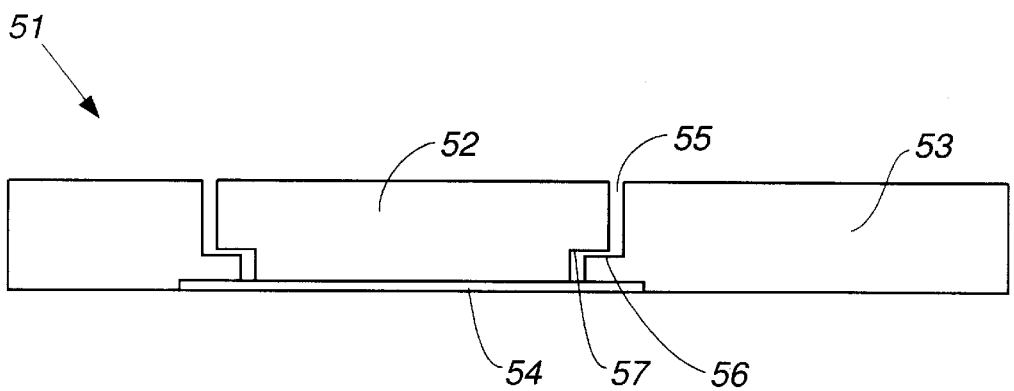
FIG. 5 is a cross-sectional view of a third preferred embodiment of an assembly in accordance with the invention.

In FIG. 5 there is illustrated a third preferred embodiment of an assembly 51 comprising a transparent lens 52, a housing 53 and a transparent seal 54. Again there is an aperture 55 shoulders 46 complementarily engaging shoulders 47 formed in lens 2. All other features are the same as that of assembly 1 and need no further discussion.

Advantageously, the present invention assists in providing water resistant sealing of lens and housing assemblies. Further, the invention provides for a flush alignment of a periphery of the lens outer surface 13 and the housing outer surface 14 adjacent the lens 2. This can simplify assembling of lenses to housings and may also provide for a visually appealing assembly.

Although the invention has been described with reference to preferred embodiments it is to be understood that the invention is not restricted to any one of the embodiments described herein.

We claim:

1. An assembly for mounting a lens onto a housing, the assembly comprising:

a housing having aperture therein providing a passage between a housing outer surface and a housing inner surface;

a lens complementarily engaging said aperture, said complementarily engaging preventing said lens from passing through said aperture, said lens having a lens outer surface and lens inner surface; and a seal adhered to both said lens inner surface and said housing inner surface thereby providing a water resistant seal.

2. An assembly for mounting a lens onto a housing as claimed in claim 1, wherein said lens and said housing provide a flush alignment of a periphery of the lens outer surface and the housing outer surface adjacent said lens.

3. An assembly for mounting a lens onto a housing as claimed in claim 2, wherein said aperture has at least two facing tapered surfaces and said lens has at least two opposing tapered edges, each abutting a respective one of said tapered facing surfaces thereby preventing said lens from passing through said aperture.

4. An assembly for mounting a lens onto a housing as claimed in claim 3, wherein said opposing tapered edges are on all sides of said lens and said tapered surfaces are on all surfaces of said aperture.

5. An assembly for mounting a lens onto a housing as claimed in claim 2, wherein said aperture has at least two facing concave surfaces and said lens has at least two opposing convex edges, each abutting a respective one of said concave facing surfaces thereby preventing said lens from passing through said aperture.

6. An assembly for mounting a lens onto a housing as claimed in claim 5, wherein said opposing convex edges are on all sides of said lens and said convex surfaces are on all surfaces of said aperture.

7. An assembly for mounting a lens onto a housing as claimed in claim 2, wherein said aperture has one or more inward extending shoulders for complementarily engaging with a portion of said lens to thereby prevent said lens from passing through said aperture.

8. An assembly for mounting a lens onto a housing as claimed in claim 7, wherein said shoulders form a continuous ledge.

9. An assembly for mounting a lens onto a housing as claimed in claim 1, wherein said seal comprises a clear sheet.

10. An assembly for mounting a lens onto a housing as claimed in claim 1, wherein said seal has an aperture therein to allow a display enclosed in said housing to be observed from said lens outer surface.

11. An assembly for mounting a lens onto a housing as claimed in claim 1, wherein there is a display device enclosed in said housing and located adjacent said inner surface to thereby provide display data through said lens.

* * * * *